United States Patent [19]

Braza et al.

[11] Patent Number: 5,468,308
[45] Date of Patent: Nov. 21, 1995

[54] SURFACE TREATED CAST IRON BEARING ELEMENT

[75] Inventors: Joseph F. Braza, Simsbury; John A. Larson, Collinsville, both of Conn.

[73] Assignee: The Torrington Company, Torrington, Conn.

[21] Appl. No.: 294,220

[22] Filed: Aug. 22, 1994

[51] Int. Cl.⁶ .............................. C22C 37/00; C21D 1/09
[52] U.S. Cl. ..................... 148/321; 148/906; 148/512; 148/525
[58] Field of Search .................. 148/512, 525, 148/906, 321

[56] References Cited

U.S. PATENT DOCUMENTS

| | | | |
|---|---|---|---|
| 4,303,137 | 12/1981 | Fischer | 148/906 |
| 4,313,771 | 2/1982 | Lorenzo et al. | 148/14 |
| 4,414,038 | 11/1983 | Dausinger et al. | 148/4 |
| 4,456,811 | 6/1984 | Hella et al. | 219/121 LM |
| 4,474,861 | 10/1984 | Ecer | 428/614 |
| 4,708,752 | 11/1987 | Kar | 147/127 |
| 5,114,499 | 5/1992 | Kusunoki | 148/512 |

FOREIGN PATENT DOCUMENTS

| | | | |
|---|---|---|---|
| 62-188728 | 8/1987 | Japan | 148/525 |
| 802457 | 10/1959 | United Kingdom | 148/906 |
| 1380635 | 1/1975 | United Kingdom | 148/906 |

OTHER PUBLICATIONS

Article entitled Options in Surfacing through Laser Technology from Compressed Air magazine, Oct. 1989, pp. 8–11.

*Primary Examiner*—Deborah Yee
*Attorney, Agent, or Firm*—John C. Bigler

[57] ABSTRACT

A bearing blank is cast or machined of cast iron to a configuration near a final shape of a desired bearing element. A first surface of the bearing blank, corresponding to a sliding surface of the desired bearing element, is remelted while other portions of the bearing blank remain in a solid state. The remelted first surface is quenched such that fine particles of iron carbide precipitate in a remelted zone having an increased hardness and a decreased presence of graphite particles. A bearing element having a core portion composed of cast iron and an integral first surface portion including a precipitate of fine iron carbide particles, and having greater hardness and lesser incidence of graphite particles than the core portion, is also described.

20 Claims, 2 Drawing Sheets

SURFACE TREATED CAST IRON BEARING ELEMENT

BACKGROUND OF THE INVENTION

This invention relates generally to plain bearings and, more particularly, to bearing elements having surfaces in sliding contact with a housing or other bearing elements.

Due to the sliding contact of plain bearings, the bearing elements must provide wear resistance as well as resistance to fracture. Typically, in applications such as spherical plain bearings, bearing elements are machined of steel and heat treated, with or without carburizing, to obtain a desired surface hardness. Grinding to final shape and treating with phosphate, molybdenum disulfide or other material for lubricity may be required after hardening.

The machining and grinding steps of such manufacturing methods add significant cost to the plain bearing, particularly when the bearing element has spherical or other non-cylindrical surfaces with tight dimensional tolerances. Heat treatment, carburizing and other surface treatment steps require considerable process time, adding to the manufacturing cost. In addition, alloy steel may be required, adding material cost and making machining more difficult.

The foregoing illustrates limitations known to exist in present bearing elements having sliding contact surfaces. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method of making a desired bearing element by surface treating a bearing blank cast or machined of cast iron, the bearing blank having a configuration near a final shape of the desired bearing element. A first surface of the bearing blank, corresponding to a sliding surface of the desired bearing element, is remelted while other portions of the bearing blank remain in a solid state. The remelted first surface is quenched such that fine particles of iron carbide precipitate in a remelted zone, the remelted zone having increased hardness and a decreased presence of graphite particles relative to said other portions.

In another aspect of the present invention, this is accomplished by providing a bearing element having a core portion composed of cast iron and an integral first surface portion including a precipitate of fine iron carbide particles and having greater hardness and lesser incidence of graphite particles than the core portion.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
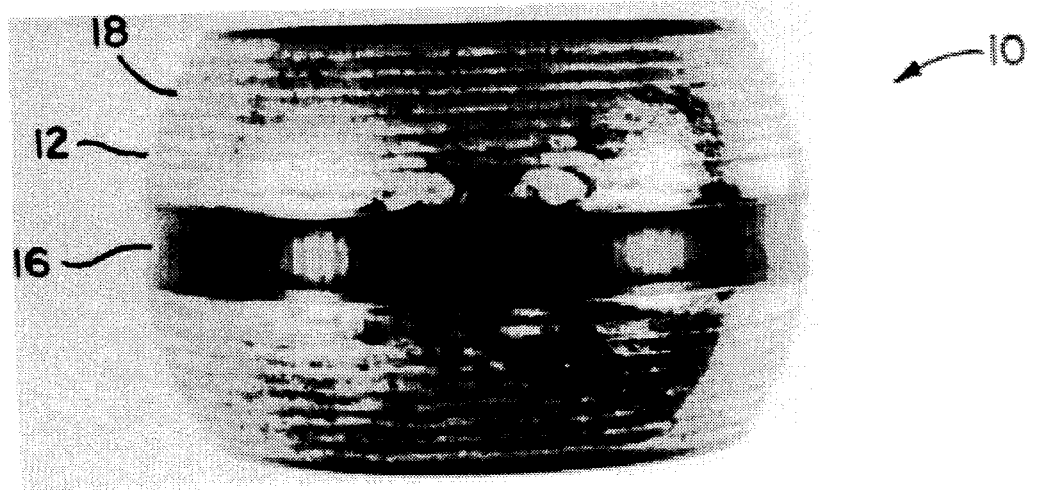
FIG. 1 is a photograph of a bearing ring of a spherical plain bearing, viewed from a side, illustrating an embodiment of the surface treated cast iron bearing element of the present invention.
Figure 2:
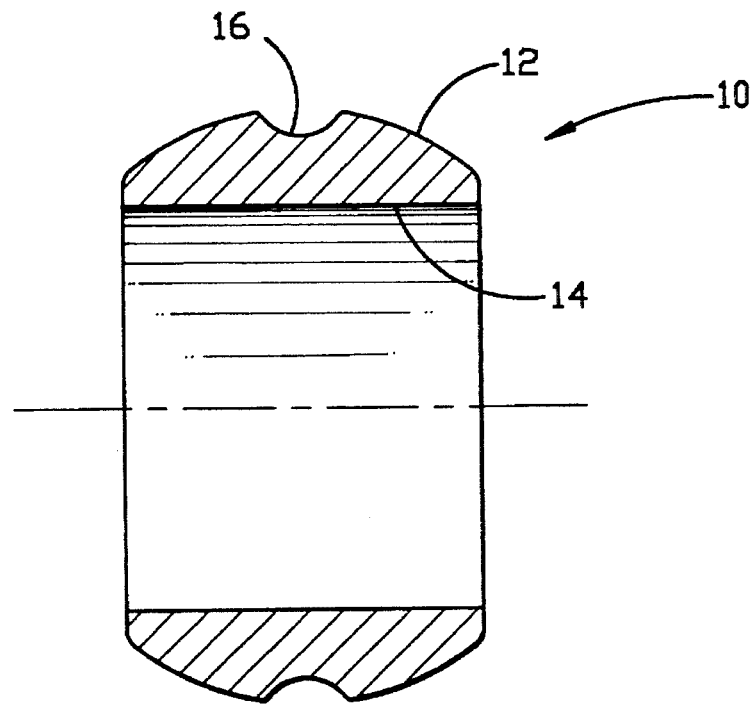
FIG. 2 is a cross sectional view of the bearing ring of FIG. 1.

Referring now to the drawings, FIGS. 1 and 2 illustrate an embodiment of the present invention comprising bearing ring 10 of a plain spherical bearing. Bearing ring 10 has spherical outer surface 12, cylindrical bore 14 concentric with spherical outer surface 12, and circumferential lubrication groove 16. In operation, sliding contact may occur between cylindrical bore 14 and a shaft, not shown, or between spherical outer surface 12 and an outer ring, not shown, either for self-alignment of the shaft or for rotation of the shaft.

As shown in the photograph of FIG. 1, spherical outer surface 12 has a mottled appearance characterized by irregular stripes 18 in a generally circumferential direction. Stripes 18 result from surface melting or "glazing" of spherical outer surface 12. The surface melting or "glazing" process creates a very hard remelted zone of white iron that is relatively free of graphite particles. The remelted zone is more wear resistant and has a hardness, typically, between 50 and 70 Rockwell C.

A bearing blank is first cast or machined of cast iron, characterized generally as ductile, grey, white, mottled or malleable iron, to a configuration near the desired final shape of bearing ring 10. Next, a focused beam of a carbon dioxide laser, excimer laser, electron beam or similar energy source is directed against spherical outer surface 12. A carbon dioxide or similar laser is generally preferred because of its versatility, efficiency, and operability in open atmosphere, unlike an electron beam source that requires a vacuum environment.

After a thin surface layer of spherical outer surface 12 is remelted by the focused beam of the energy source, the focused beam is advanced over bearing ring 10 such that the remaining mass of bearing ring 10 produces a rapid quench of the remelted surface layer. The characteristics of the remelted surface layer are dependent upon the strength of the focused beam, the rate of advancement of the focused beam, the amount of preheat, and the number of passes of the focused beam over the surface. The rapid solidification of the remelted surface layer results in very fine carbide particles precipitating from the supersaturated melt.

Figure 3:
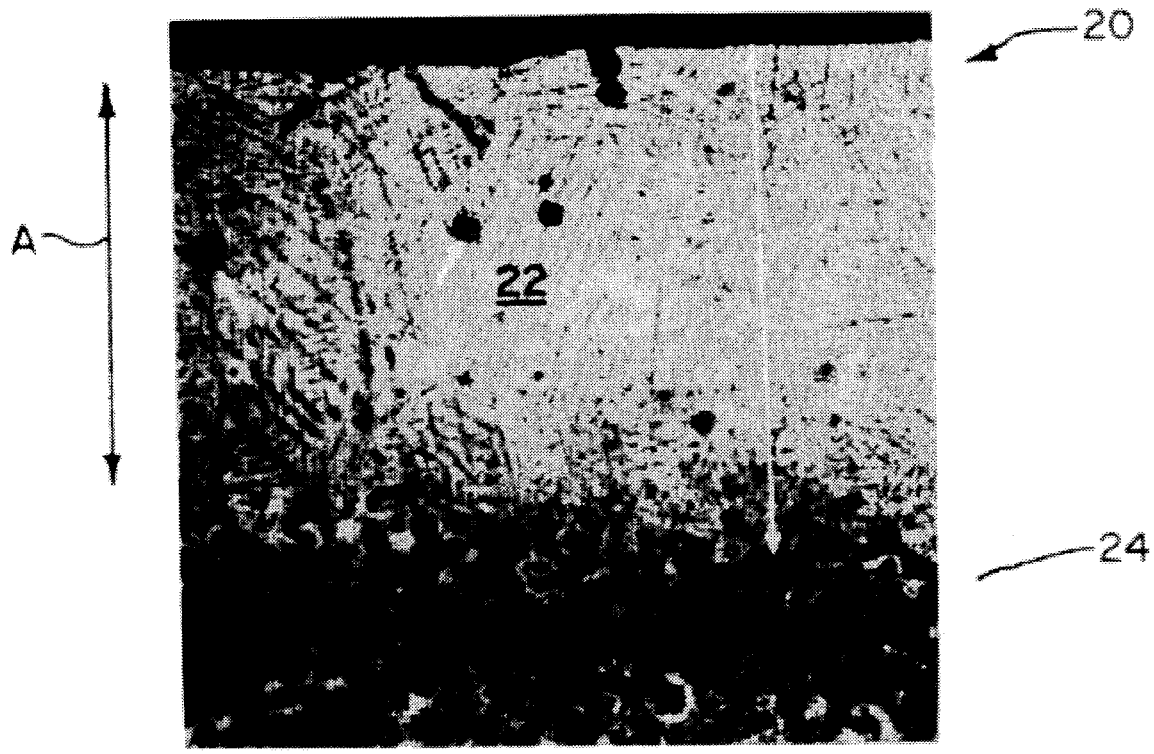
FIG. 3 is a photograph of an etched cross-section of cast iron at 100× magnification, illustrating the microstructure of the surface treated cast iron bearing element of the present invention.

FIG. 3 is a photograph of an etched cross-section of unalloyed ductile iron (Grade 80-55-06) at 100× magnification illustrating the microstructure produced by the remelting process used. Remelted zone 20 has depth A of 0.022 to 0.025 inches (0.56 to 0.635 mm) in this particular sample and is characterized by exceptionally fine grain structures and non-equilibrium phases not normally obtained with casting processes. Although several graphite particles 22 still remain in remelted zone 20, remelted zone 20 is relatively free of such particles compared to other portions 24 of the ductile iron sample of FIG. 3.

Although other parameters could be used to provide the surface remelting or "glazing" of bearing ring 10 of FIGS. 1 and 2, the following parameters are set out here as an example. A 5.0 KW Spectra-Physics 974 carbon dioxide laser was set at 4.8 KW power; the beam was focused on the surface with 1.0 meter focal length; the bearing ring was preheated to 1000 degrees Fahrenheit; and the focused beam was advanced at 150 inches per minute with a spiral pitch of 0.070 inches for a single pass. The hardness of the resulting remelted zone measured as follows:

| Depth (inches) | Hardness (Rockwell C) |
| --- | --- |
| 0.002 | 56 |
| 0.005 | 58 |
| 0.010 | 61 |
| 0.015 | 58 |
| 0.020 | 54 |
| 0.025 | 37 |
| 0.030 | 24 |

The present invention is not limited to bearing rings of spherical plain bearings and is applicable to many other types of bearing elements, particularly those having sliding contact surfaces. By selecting appropriate parameters, the characteristics of the remelted zone at the surface of the bearing element may be adapted to particular requirements. Typically, the preferred depth of the remelted zone is 0.020 to 0.030 inches, although a depth of 0.035 inches or more may be achieved using a slower rate of advancement or multiple passes.

Figure 4:
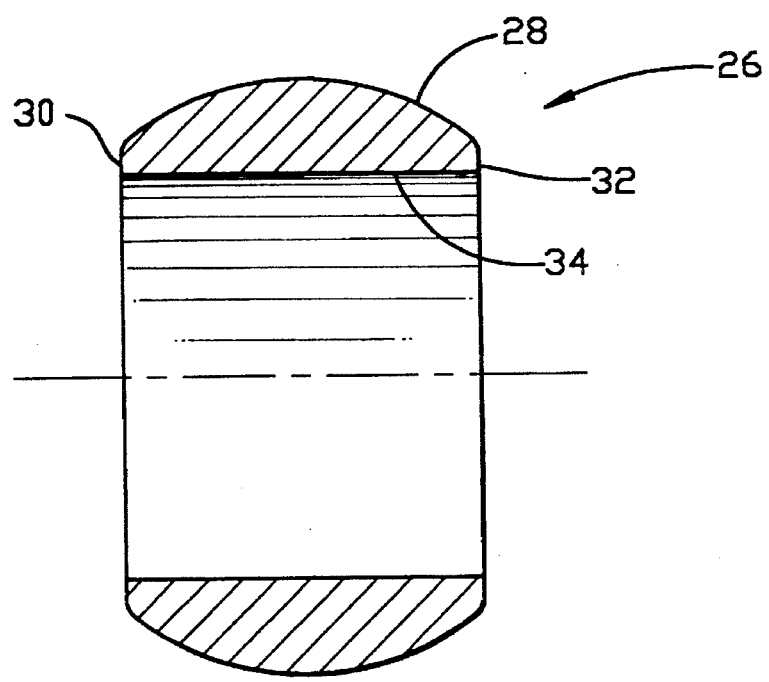
FIG. 4 is a cross sectional view of a bearing ring of a trunnion bearing illustrating another embodiment of the surface treated cast iron bearing element of the present invention.

FIG. 4 illustrates another embodiment of the present invention comprising bearing ring 26 of a trunnion bearing. Bearing ring 26 has spherical outer surface 28, cylindrical bore 34 concentric with spherical outer surface 28, and axial ends 30 and 32 having different outside diameters. In operation, sliding contact occurs between spherical outer surface 28 and a housing, not shown, either for self-alignment or for rotation.

Using the same steps described above with respect to bearing ring 10 of FIGS. 1 and 2, bearing ring 26 is formed of cast iron and surface melting or "glazing" is used to create a very hard remelted zone of white iron on spherical outer surface 28. The remelted zone has a structure of precipitated fine carbide particles and is relatively free of graphite particles, having a structure similar to that illustrated in FIG. 3.

Significantly, the surface melting or "glazing" process does not cause severe dimensional changes and the resulting surface may be sufficiently smooth to permit use of the bearing element in some applications without subsequent grinding. Even in applications where subsequent grinding is required, such grinding is minimal and the associated costs are significantly less than the grinding costs associated with conventional manufacturing methods.

Other portions of the bearing element, such as bore 14 of bearing ring 10, for example, shown in FIG. 2, may be modified by laser hardening to increase wear resistance or for other purposes. In that process, the laser beam locally heats the surface above a phase transformation temperature but below the melting point and is quenched by the remaining mass of the bearing element. The rapid cooling of the surface results in a hardened surface layer having a martensitic phase and a hardness, typically, between 40 and 60 Rockwell C.

Applicants' test results have confirmed that bearing elements made in accordance with the present invention provide significantly increased wear resistance over similar conventional bearing elements. Other advantages result from the toughness of the cast iron core. In addition, the elimination of machining, grinding and surface treatment operations and the substitution of cast iron for more expensive material results in substantial cost savings over conventional bearing elements.

From the above description, it will be apparent that the present invention provides a surface treated bearing element having improved performance at reduced cost. Particular advantages result when spherical or other non-cylindrical surfaces with tight tolerances are required. In addition to being applicable to bearing rings of plain spherical bearings and trunnion bearings, the method of manufacture described herein is applicable to a wide variety of bearing elements, especially those having surfaces in sliding contact with a housing or other bearing elements.

Having described the invention, what is claimed is:

1. A method of making a desired bearing element comprising the following steps:

casting a bearing blank of cast iron, the bearing blank having a configuration near a final shape of the desired bearing element;

remelting a first surface of the bearing blank, the first surface corresponding to a sliding contact surface of the desired bearing element, other portions of the bearing blank remaining in a solid state; and quenching the remelted first surface such that fine particles of iron carbide precipitate in a remelted zone, the remelted zone having increased hardness and decreased presence of graphite particles relative to said other portions.

2. The method according to claim 1, wherein the step of remelting the first surface of the bearing blank is effected by a laser beam.

3. The method according to claim 1, wherein the step of remelting the first surface of the bearing blank is effected by a laser beam from a carbon dioxide laser.

4. The method according to claim 1, wherein the bearing blank has a ring configuration and the step of remelting the first surface is effected by a beam from an energy source directed in a spiral pattern at a predetermined rate of advancement.

5. The method according to claim 1, wherein the steps of remelting and quenching of the first surface result in the remelted zone having a depth between 0.020 and 0.030 inches.

6. The method according to claim 1, wherein the steps of remelting and quenching of the first surface result in the remelted zone having a hardness between 50 and 70 Rockwell C.

7. The method according to claim 1, wherein said other portions of the desired bearing element have a hardness less than 50 Rockwell C.

8. The method according to claim 1, further comprising an additional step of preheating the bearing blank to a temperature of 950 to 1050 degrees Fahrenheit before the step of remelting the first surface.

9. The method according to claim 1, wherein the step of quenching of the first surface is effected primarily by the other portions of the bearing blank providing a heat sink.

10. The method according to claim 1, wherein the steps of remelting and quenching result in the remelted zone having the final shape of the desired bearing element without grinding.

11. The method according to claim 1, further comprising an additional step of grinding a surface of the remelted zone to obtain the final shape of the desired bearing element.

12. A method of making a desired bearing element comprising the following steps:

machining a bearing blank of cast iron, the bearing blank having a configuration near a final shape of the desired bearing element;

remelting a first surface of the bearing blank, the first surface corresponding to a sliding surface of the desired bearing element, other portions of the bearing blank remaining in a solid state; and quenching the remelted first surface such that fine particles of iron carbide precipitate in a remelted zone, the remelted zone having increased hardness and decreased presence of graphite particles relative to said other portions.

13. A bearing element comprising:

a core portion composed of cast iron; and a first surface portion including a precipitate of fine iron carbide particles and having a greater hardness and a lesser incidence of graphite particles than the core portion, the first surface portion being integral with the core portion.

14. The bearing element according to claim 13, wherein the first surface portion has a depth between 0.020 and 0.030 inches.

15. The bearing element according to claim 13, wherein the first surface portion has a hardness between 50 and 70 Rockwell C.

16. The bearing element according to claim 13, wherein the core portion has a hardness less than 50 Rockwell C.

17. The bearing element according to claim 13, wherein the bearing element is a bearing ring of a spherical plain bearing.

18. The bearing element according to claim 13, wherein the bearing element is a bearing ring of a trunnion bearing.

19. The bearing element according to claim 13, further comprising a second surface portion with a martensitic structure having a greater hardness than the core portion.

20. The bearing element according to claim 19, wherein the second surface portion has a hardness between 40 and 60 Rockwell C.

\* \* \* \* \*